United States Patent
Chen et al.

(10) Patent No.: US 8,871,989 B2
(45) Date of Patent: Oct. 28, 2014

(54) COMBINATION OF HYDROGENATION AND BASE CATALYZED DEPOLYMERIZATION FOR LIGNIN CONVERSION

(75) Inventors: John Q. Chen, Glenview, IL (US); Mark B. Koch, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 1112 days.

(21) Appl. No.: 12/394,892

(22) Filed: Feb. 27, 2009

(65) Prior Publication Data

US 2010/0137663 A1 Jun. 3, 2010

(51) Int. Cl.
- C10G 1/06 (2006.01)
- C10G 1/00 (2006.01)
- C10G 1/08 (2006.01)

(52) U.S. Cl.
CPC .............. *C10G 1/08* (2013.01); *C10G 2400/30* (2013.01); *C10G 1/002* (2013.01); *C10G 2300/4018* (2013.01); *C10G 2300/1014* (2013.01)
USPC ............ 585/242; 585/240; 585/400; 585/469

(58) Field of Classification Search
USPC ................... 585/240, 242, 400, 469; 568/716
See application file for complete search history.

(56) References Cited

U.S. PATENT DOCUMENTS

| | | | |
|---|---|---|---|
| 2,220,624 A * | 11/1940 | Sherrard et al. | 530/503 |
| 2,331,154 A | 10/1943 | Adkins | |
| 2,870,133 A | 1/1959 | Giesen | |
| 3,223,698 A * | 12/1965 | Oshima et al. | 530/503 |
| 4,311,578 A * | 1/1982 | Fant et al. | 208/416 |
| 4,396,786 A * | 8/1983 | Bond et al. | 585/240 |
| 4,420,644 A * | 12/1983 | Huibers et al. | 568/806 |
| 4,647,704 A | 3/1987 | Engel et al. | |
| 4,731,491 A | 3/1988 | Urban et al. | |
| 5,019,135 A | 5/1991 | Sealock et al. | |
| 5,180,868 A * | 1/1993 | Baker et al. | 585/240 |
| 5,959,167 A | 9/1999 | Shabtai et al. | |
| 6,172,272 B1 | 1/2001 | Shabtai et al. | |
| 2003/0100807 A1 | 5/2003 | Shabtai et al. | |
| 2003/0115792 A1* | 6/2003 | Shabtai et al. | 44/605 |
| 2007/0100162 A1 | 5/2007 | Petrus et al. | |
| 2008/0050792 A1 | 2/2008 | Zmierczak et al. | |
| 2008/0053870 A1 | 3/2008 | Marker et al. | |
| 2008/0076945 A1 | 3/2008 | Marker et al. | |

FOREIGN PATENT DOCUMENTS

WO  WO 2006/119357 A2 * 11/2006 ............. C07C 7/148

OTHER PUBLICATIONS

Gates, "Catalysis" in Kirk-Othmer Encyclopedia of Chemical Technology, 2002, John Wiley & Sons, available on-line Aug. 16, 2002.*
Parker, et al., "The Structure of Dimers from the Alkaline Hydrogenation of Lignin" in Lignin Structures and Reactions, J. Marton, ed., Advances in Chemistry, vol. 59, 1966—month unknown.*

(Continued)

*Primary Examiner* — In Suk Bullock
*Assistant Examiner* — Bradley Etherton
(74) *Attorney, Agent, or Firm* — Arthur E. Gooding

(57) ABSTRACT

A process for the conversion of lignin to chemical precursors is presented. The process comprises treating the lignin to form less acidic compounds. The process includes reacting lignin with a hydrogenation catalyst under a hydrogen atmosphere to convert acidic oxygenate compounds to less acidic oxygenates or hydrocarbons. The oxygenate compounds are reacted in a dehydrogenation and deoxygenation process to remove the oxygen and to convert the cyclic hydrocarbons back to aromatic compounds.

16 Claims, 2 Drawing Sheets

(56) References Cited

OTHER PUBLICATIONS

Schultz, Tor P., "The Attempted Depolymerization of Hc1 Lignin by Catalytic Hydrogenolysis", Jour of Wood Chem and Tech., 2(1), 33-46 (1982), Miss. State Uiv.

Gendler, J.L., "Hydroxy-Aromatics from Lignin Hydrogenolysis", Hydrocarbon Research, Inc., Academic Press, 1983, p. 391-400, Lawrenceville, NJ.

Harris, Elwin E., "Lignin Hydrogenation Products", Industrial and Engineering Chemistry, v 41, n 9, Sep. 1949, p. 2063-2067, Madison, WI.

Oasmaa, Anja, "Catalytic Hydrotreatment of Some Technical Lignins", Bioresource Technology 45 (1993) 189-194, Espoo, Finland.

Mohdavi, B., "Electrocatalytic Hydrogenolysis of Lignin Model Dimers at Raney Nickel Electrodes", Jour. of Applied Electrochemistry 27 (1997) 605-611. Quebec, CA.

Meier, D., "Catalytic Hydrocracking of Lignins to Useful Aromatic Feedstocks", DGML Conference Sep. 29 to Oct. 1, 2008, pp. 299-304, Berlin, Germany.

International Search Report & Written Opinion dated Jul. 26, 2010, PCT/US2009/067422, International Filing Date Dec. 10, 2009.

* cited by examiner

COMBINATION OF HYDROGENATION AND BASE CATALYZED DEPOLYMERIZATION FOR LIGNIN CONVERSION

FIELD OF THE INVENTION

This invention relates to processes for obtaining hydrocarbons from biomass. More particularly, this invention relates to the treatment of lignin and cellulosic waste to produce chemicals or fuels.

BACKGROUND OF THE INVENTION

Renewable energy sources are of increasing importance. They are a means of reducing dependence on imported oil and provide a substitute for fossil fuels. Also, renewable resources can provide for basic chemical constituents to be used in other industries, such as chemical monomers for the making of plastics. Biomass is a renewable resource that can provide some of the needs for sources of chemicals and fuels.

Biomass includes, but is not limited to, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. The economics depend on the ability to produce large amounts of biomass on marginal land, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. In addition, biomass contributes to the removal of carbon dioxide from the atmosphere as the biomass grows. The use of biomass can be one process for recycling atmospheric carbon while producing fuels and chemical precursors. Biomass when heated in an environment with low or no oxygen will generate a liquid product known as pyrolysis oil. Biomass also contains a significant amount of lignin, which contains a substantial amount of material that can be used as precursors for chemical and fuels. The lignin structure contains aromatic rings that are linked together through carbon-carbon bonds and through carbon-oxygen bonds. The compounds that have high value are the alkyl-benzene compounds and phenolic compounds that can be recovered from the biomass.

One of ways to convert lignin to fuels or chemicals is by base catalyzed depolymerization followed by hydrotreating. This process uses a strong base to partially break up the lignin compounds. One major problem of this approach is high consumption of strong base such as NaOH which makes it not very attractive from economic stand point of view. Our recent study showed that final pH of reaction product need to be above 12.4 in order to have high lignin conversion. This makes the use of low cost basic materials such as boiler ashes impractical.

Processes that avoid this need for strong bases can shift the recovery of organic precursors from biomass to economically viable processes, as well as lessen the cost of environmental protection for bio-conversion processes.

SUMMARY OF THE INVENTION

In the processing of biomass for recovering valuable chemical products, base catalyzed depolymerization of the lignin found in biomass provides a route for recovering many of these chemicals. The reduction of the amount and strength of the base used for depolymerization is important in the economics and safety of the process. The present invention for recovering chemicals from lignin includes a combining lignin with a hydrogenation catalyst to form a mixture under a hydrogen atmosphere. The mixture is reacted at hydrolysis process conditions to form an intermediate product stream having reduced oxygen content, and producing less acidic mixture of oxygenates and hydrocarbons. The intermediate product stream is contacted with a dehydrogenation and deoxygenation catalyst at dehydrogenation and deoxygenation reaction conditions thereby generating a product stream comprising aromatic compounds. In addition to the dehydrogenation, there is additional cracking of some of the residual lignin polymer.

Other objects, advantages and applications of the present invention will become apparent to those skilled in the art from the following detailed description and drawings.

DETAILED DESCRIPTION OF THE INVENTION

Biomass comprises a substantial amount of carbonaceous material that can be converted to hydrocarbons. Generally, the biomass material comprises carbohydrates, and other oxygenates. One important organic material is the lignin that is found in most vegetative biomass. The lignin comprises useful aromatic ring compounds, such that when the lignin is broken down, the aromatic ring compounds can be recovered and used as precursors to polymers, fuels, or other materials.

Base catalysis for the depolymerization of the lignin can break down the lignin for the recovery of phenols and other aromatic compounds. However, base catalysis uses a large amount of a strong basic material for this process. The high usages of a strong base is required for obtaining sufficient solubility of the lignin, in order for the hydrodeoxygenation reaction to proceed. One of the main reasons for the large consumption of the base is that the reaction products include phenols and phenolic derivatives and carbon dioxide. These are acidic compounds and neutralize the base during the process.

The reduction in the need for a strong base can reduce cost and the handling of strong chemicals. The acidic environment from the aromatic oxygenate derivatives can be reduced by hydrogenating the aromatic rings and removing some of the oxygen to convert the aromatic oxygenates to less acidic saturated hydrocarbon compounds. An example, is the conversion of phenolic compounds to less acidic alcohols, such as cyclohexanol. The hydrogenated compounds can be further deoxygenated to naphthenic compounds, such as cyclohexane with the oxygen atoms removed. In addition, when a base is used in the process, it is liberated and can be recovered and reused. Hydrogen can be recovered in the subsequent dehydrogenation and deoxygenation step for converting the cyclic hydrocarbons back to aromatics.

Figure 1:
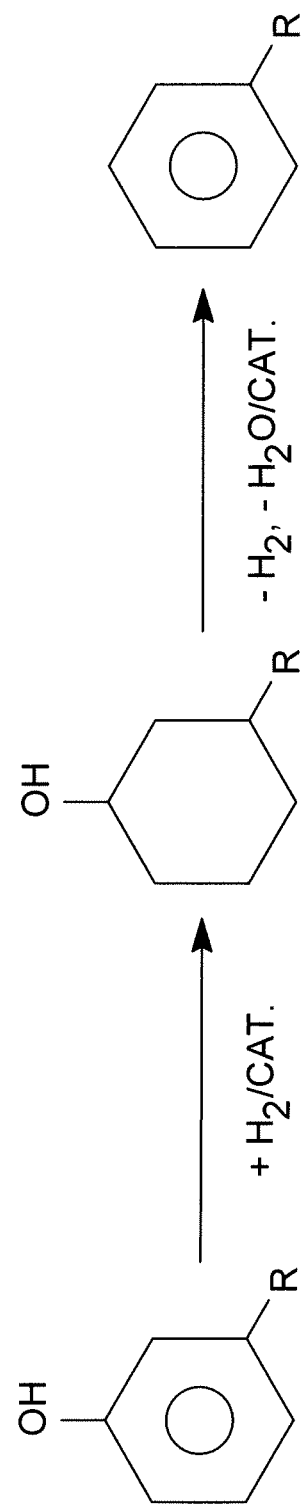
FIG. 1 shows the basic steps of the process as applied to an idealized situation, where a phenolic compound is hydrogenated and then deoxygenated.

The present invention for producing chemicals from lignin comprises combining the lignin with a hydrogenation catalyst under a hydrogen atmosphere, forming a lignin slurry mixture. The mixture is reacted at lignin hydrolysis process conditions to form an intermediate product stream having a reduced oxygenate content and a lower acidity. In addition, without being limited to any particular theory, it is believed that some of the aromatic compounds are hydrogenated to saturated or partially saturated hydrocarbon compounds. The intermediate product stream is contacted with a dehydrogenation and deoxygenation catalyst at dehydrogenation reaction conditions to form a product stream comprising aromatic compounds. The two-step process is shown in FIG. 1, which is an idealized simplification of the process. The first step hydrogenates more acidic oxygenate compounds, such as phenolic compounds, by removing some of the oxygen and performing at least a partial catalytic hydrogenation of the aromatic compounds to produce much less acidic hydrocarbons, such as cycloalkane alcohols or cycloalkanes, and to depolymerize the lignin and remove oxygen from the lignin. The second step, catalytically deoxygenates and dehydrogenates the hydrocarbons, such as cycloalkane alcohols or cycloalkanes, to produce aromatics.

Although it is not necessary to add a base to the lignin slurry, the process can further comprise adding a base to the slurry and hydrogenation catalyst to form a mixture having a pH greater than 6, and preferably having a pH between 8 and 12 during the hydrolysis process. The process further comprises recovering the base used in the hydrolysis process. A weaker base can be used, and bases are selected from alkali metal hydroxides, alkaline earth metal hydroxides, alkaline earth metal oxides, alkali metal carbonates, and mixtures thereof.

The hydrolysis reaction conditions include heating the reactor to a temperature between 100° C. and 450° C., with a preferred temperature between 250° C. and 450° C. The hydrolysis requires the addition of hydrogen, and the hydrogen is under an atmosphere at a pressure between 0.7 MPa (100 psia) to about 21 MPa (3050 psia), and preferably between 3.4 MPa (493 psia) to about 14 MPa (2030 psia). The hydrogenation reaction condition is operated at a liquid hourly space velocity (LHSV) is between 0.1 and 100 $hr^{-1}$.

The hydrolysis process is operated over a hydrogenation catalyst, which comprises a metal on a support. A preferred hydrogenation catalytic metal is a noble metal, and especially one selected from the platinum group. Two metals that are preferred are platinum (Pt) and palladium (Pd). Supports for the catalyst include zeolites, molecular sieves, $Al_2O_3$, $SiO_2$, MgO, $ZrO_2$, $TiO_2$, mixed metal oxides and carbon.

In an alternate embodiment, the hydrogenation catalyst can comprise a base metal on a support. Base metals useable in this process include nickel (Ni), chromium (Cr), molybdenum (Mo) and tungsten (W). The process can also use a metal sulfide, wherein the metal in the metal sulfide is selected from one or more of the base metals listed.

In a further embodiment, the hydrogenation process catalyst can comprise a second metal, wherein the second metal is includes one or more of the metals: tin (Sn), indium (In), ruthenium (Ru), rhodium (Rh), rhenium (Re), osmium (Os), iridium (Ir), germanium (Ge), lead (Pb), cobalt (Co), gallium (Ga), zinc (Zn) and thallium (Tl).

The second step of the process comprises dehydrogenation and deoxygenation of the hydrocarbon ring compounds, or naphthenes, such as cyclohexane, and hydrocarbon compounds having cyclohexane rings. The dehydrogenation and deoxygenation reactions removes the oxygen and returns the naphthenes to a product stream comprising aromatic compounds under dehydrogenation conditions. The reaction conditions include a pressure between 1 kPa and 1013 kPa, a temperature between 400° C. and 900° C., and a liquid hourly space velocity (LHSV) between 0.1 and 100 $hr^{-1}$. The product stream has benzenes, toluenes, and other alkyl-benzenes that can be separated for use as precursors to other processes, including the formation of fuel feedstocks. The dehydrogenation and deoxygenation step can include a cracking function for further depolymerization of the lignin molecules. The cracking function can be provided by an acid function from the catalyst, or provided by a cracking function from the catalyst involving a cracking metal.

Figure 2:
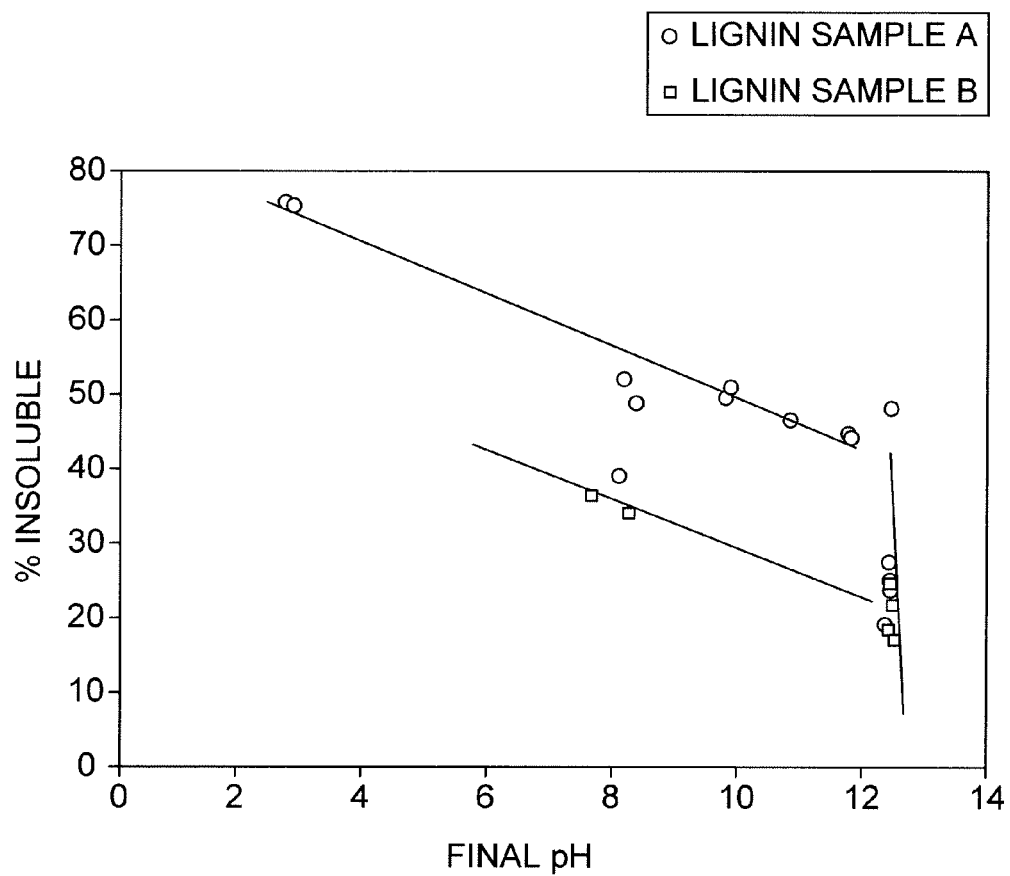
FIG. 2 shows the effect of pH on the insoluble yield of two lignin samples.

FIG. 2 illustrates the consumption of a base in the conversion of lignin from two different sources of lignin. The process requires the solubilization of lignin to enable the breakdown of lignin into smaller molecules. In the process, a large amount of base is required to carry out the process, and the base needs to be sufficiently strong to enable the raising of the pH to greater than 12.4 in order to achieve a low percentage of insoluble materials. The results illustrate that the amount of base, when the base is NaOH, has to be greater than 40% of the amount of lignin, by weight, to achieve a sufficiently high pH and the desired solubility. Without being bound by any particular theory, it is believed that the hydrogenation process reduces the need for a significant addition of a strong base to the lignin solution by hydrogenating the more acidic oxygenates, such as phenolic compounds, in addition to depolymerizing the lignin, thereby creating an intermediate stream. The process is then continued with a second step where the intermediate stream is processed using a dehydrogenation and deoxygenation catalyst at dehydrogenation and deoxygenation conditions, thereby generating a hydrocarbon stream comprising aromatics.

The effect of the hydrogenation function produces a higher soluble product without the need for the addition of strong base, as illustrated in Table 1. In the table, two runs were followed using the current method for base catalytic depolymerization, and two runs were run using the present invention with hydrogenation of the aromatic rings. When the process was run with a strong base, there was still a substantial amount of insoluble material. Even with the addition of 10 times the amount of base, the percent insoluble matter was only reduced by about 40%. By hydrogenating the lignin, the addition of base was not necessary to obtain a significant improvement in the reduction of insoluble matter. The present invention shows that there is substantially increased solubility of the hydrogenated hydrocarbons, even without the addition of a strong base. Increasing the temperature allowed for increased solubility in an acidic environment and using no base.

TABLE 1

Comparison of influence of hydrogenation of solubility and pH

| | | | | |
|---|---|---|---|---|
| NaOH (g) | 10 | 1 | 1 | 0 |
| 5% Pd on C (g) | 0 | 0 | 1 | 1 |
| H2 (psig) | 0 | 0 | 500 | 500 |
| Temperature (° C.) | 320 | 320 | 295 | 325 |
| final pH | 12.4 | 8.1 | 10.3 | 6.3 |
| % insoluble | 24 | 39 | 11 | 10 |
| % ether soluble | 33 | 9 | 55 | 62 |

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for producing chemicals from lignin, comprising:

combining lignin with a hydrogenation catalyst under a hydrogen atmosphere to form a mixture;

reacting the mixture at lignin hydrolysis and aromatic hydrogenation process conditions, including a total reactor pressure between 3.4 MPa to about 14 MPa and a reactor temperature ranging from about 325° C. to about 450° C. to form water and an intermediate product stream having a reduced oxygen content and comprised of naphthenes and cyclohexane alcohols; and contacting the intermediate product stream with a deoxygenation and a dehydrogenation catalyst at naphthene dehydrogenation reaction conditions thereby generating a product stream comprising aromatic and phenolic compounds.

2. The process of claim 1 further comprising combining a base with the lignin and hydrogenation catalyst forming the mixture having a pH greater than 6.

3. The process of claim 2 further comprising recovering the base used for lignin hydrolysis process.

4. The process of claim 2 wherein the base used is selected from the group consisting of alkali metal hydroxides, alkaline earth metal hydroxides, alkaline earth metal oxides, alkali metal carbonates, and mixtures thereof.

5. The process of claim 1 wherein the hydrogenation catalyst comprises a noble metal on a support.

6. The process of claim 5 wherein the noble metal is selected from the group consisting of platinum (Pt), palladium (Pd), and mixtures thereof.

7. The process of claim 5 wherein the catalyst support is selected from the group consisting of zeolites, molecular sieves, $Al_2O_3$, $SiO_2$, MgO, $ZrO_2$, $TiO_2$, mixed metal oxides, carbon, and mixtures thereof.

8. The process of claim 1 wherein the hydrogenation catalyst comprises a base metal selected from the group consisting of nickel (Ni), chromium (Cr), molybdenum (Mo), tungsten (W), and mixtures thereof.

9. The process of claim 1 wherein the hydrogenation catalyst comprises a metal sulfide.

10. The process of claim 9 wherein the metal in the metal sulfide is selected from the group consisting of nickel (Ni), chromium (Cr), molybdenum (Mo), tungsten (W), and mixtures thereof.

11. The process of claim 9 wherein the hydrogenation catalyst further comprises tin (Sn), indium (In), ruthenium (Ru), rhodium (Rh), rhenium (Re), osmium (Os), iridium (Ir), germanium (Ge), lead (Pb), cobalt (Co), gallium (Ga), zinc (Zn), thallium (Tl), and mixtures thereof.

12. The process of claim 1 wherein the hydrolysis and hydrogenation process conditions include a liquid hourly space velocity (LHSV) between 0.1 and 100 $hr^{-1}$.

13. The process of claim 1 wherein the dehydrogenation reaction conditions include a pressure between 1 kPa and 1013 kPa.

14. The process of claim 1 wherein the dehydrogenation reaction conditions include a temperature of between 400° C. and 900° C.

15. The process of claim 1 wherein the dehydrogenation and the deoxygenation catalyst includes a cracking function.

16. A process for producing chemicals from lignin, comprising:

combining lignin with a base and a hydrogenation catalyst under a hydrogen atmosphere, at a total reaction pressure between 3.4 MPa to about 14 MPa, to form a mixture having a pH greater than 6;

reacting the mixture at lignin hydrolysis and aromatic hydrogenation process conditions and at a reactor temperature ranging from about 325° C. to about 450° C. to form water and an intermediate product stream having a reduced oxygen content and comprised of naphthenes and cyclohexane alcohols;

recovering the base used for lignin hydrolysis process; and contacting the intermediate product stream with a dehydrogenation catalyst at naphthene dehydrogenation reaction conditions to form a product stream comprising aromatic and phenolic compounds.

\* \* \* \* \*